United States Patent
Halalay et al.

(10) Patent No.: US 10,581,119 B2
(45) Date of Patent: Mar. 3, 2020

(54) POLYMERIC ION TRAPS FOR SUPPRESSING OR MINIMIZING TRANSITION METAL IONS AND DENDRITE FORMATION OR GROWTH IN LITHIUM-ION BATTERIES

(71) Applicant: GM Global Technology Operations LLC, Detroit, MI (US)

(72) Inventors: Ion C. Halalay, Grosse Pointe Park, MI (US); Zicheng Li, San Jose, CA (US); Timothy J. Fuller, Pittsford, NY (US); Bob R. Powell, Jr., Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 15/644,422

(22) Filed: Jul. 7, 2017

(65) Prior Publication Data
US 2019/0013551 A1   Jan. 10, 2019

(51) Int. Cl.
*H01M 10/42* (2006.01)
*H01M 10/0567* (2010.01)
(Continued)

(52) U.S. Cl.
CPC ......... *H01M 10/4235* (2013.01); *B01J 39/04* (2013.01); *B01J 39/18* (2013.01);
(Continued)

(58) Field of Classification Search
CPC ......... H01M 10/0525; H01M 10/0568; H01M 10/4235; H01M 2220/20; H01M 4/587;
(Continued)

(56) References Cited

U.S. PATENT DOCUMENTS 4,530,963 A   7/1985   DeVoe et al.
4,670,363 A   6/1987   Whitney et al.
(Continued)

FOREIGN PATENT DOCUMENTS

CN   101803066 A   8/2010
CN   102130361 A   7/2011
(Continued)

OTHER PUBLICATIONS

Banerjee, et al.; "Review—Multifunctional Materials for Enhanced Li-Ion Batteries Durability: A Brief Review of Practical Options"; Journal of the Electrochemical Society, 164 (1); Jan. 5, 2017; pp. A6315-A6323.
(Continued)

*Primary Examiner* — Basia A Ridley
*Assistant Examiner* — Heng M. Chan
(74) *Attorney, Agent, or Firm* — Harness, Dickey & Pierce, P.L.C.

(57) ABSTRACT

Electrochemical cells that cycle lithium ions and methods for suppressing or minimizing dendrite formation are provided. The electrochemical cells include a positive electrode, a negative electrode, and a separator disposed therebetween. At least one transition metal ion-trapping moiety, including one or more polymers functionalized with one or more trapping groups, may be included within the electrochemical cell as a coating, pore filler, substitute pendant group, or binder. The one or more trapping groups may be selected from the group consisting of: crown ethers, siderophores, bactins, ortho-phenanthroline, iminodiacetic acid dilithium salt, oxalates malonates, fumarates, succinates, itaconates, phosphonates, and combinations thereof, and may bind to metal ions found within the electrochemical cell to minimize or suppress formation of dendrite protrusions on the negative electrode.

18 Claims, 1 Drawing Sheet

(51) Int. Cl.

| | |
|---|---|
| *H01M 10/052* | (2010.01) |
| *H01M 4/13* | (2010.01) |
| *B01J 39/04* | (2017.01) |
| *B01J 39/18* | (2017.01) |
| *C08J 5/22* | (2006.01) |
| *H01M 10/0525* | (2010.01) |
| *H01M 10/0568* | (2010.01) |
| *H01M 4/587* | (2010.01) |
| *H01M 2/16* | (2006.01) |
| *H01M 4/36* | (2006.01) |
| *H01M 4/62* | (2006.01) |

(52) U.S. Cl.
CPC ........... *C08J 5/2206* (2013.01); *H01M 2/166* (2013.01); *H01M 2/1646* (2013.01); *H01M 2/1653* (2013.01); *H01M 2/1686* (2013.01); *H01M 4/13* (2013.01); *H01M 4/366* (2013.01); *H01M 4/587* (2013.01); *H01M 4/622* (2013.01); *H01M 4/628* (2013.01); *H01M 10/052* (2013.01); *H01M 10/0525* (2013.01); *H01M 10/0567* (2013.01); *H01M 10/0568* (2013.01); *C08J 2300/00* (2013.01); *H01M 2220/20* (2013.01)

(58) Field of Classification Search
CPC ........... H01M 10/052; H01M 10/0567; H01M 2/1646; H01M 2/1653; H01M 2/166; H01M 2/1686; H01M 4/13; H01M 4/366; H01M 4/622; H01M 4/628
See application file for complete search history.

(56) References Cited

U.S. PATENT DOCUMENTS

| | | | |
|---|---|---|---|
| 5,130,211 A | 7/1992 | Wilkinson et al. |
| 6,218,055 B1 | 4/2001 | Shah et al. |
| 6,689,513 B1 | 2/2004 | Morigaki et al. |
| 7,022,812 B2 | 4/2006 | Yoshimura et al. |
| 7,282,109 B2 | 10/2007 | Takata et al. |
| 8,349,031 B2 | 1/2013 | Take et al. |
| 8,455,140 B1 | 6/2013 | Huang et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,568,930 B2 | 10/2013 | Halalay et al. |
| 8,663,840 B2 | 3/2014 | Nazri et al. |
| 8,765,301 B2 | 7/2014 | Halalay et al. |
| 8,785,054 B2 | 7/2014 | Halalay et al. |
| 8,835,058 B2 | 9/2014 | Kia et al. |
| 8,951,654 B2 | 2/2015 | Sachdev et al. |
| 8,974,946 B2 | 3/2015 | Cai et al. |
| 8,993,646 B2 | 3/2015 | Huang |
| 8,999,584 B2 | 4/2015 | Jiang et al. |
| 9,023,520 B2 | 5/2015 | Halalay et al. |
| 9,028,565 B2 | 5/2015 | Huang |
| 9,077,038 B2 | 7/2015 | Halalay et al. |
| 9,093,705 B2 | 7/2015 | Xiao et al. |
| 9,123,939 B2 | 9/2015 | Xiao et al. |
| 9,130,231 B2 | 9/2015 | Halalay et al. |
| 9,138,932 B2 | 9/2015 | Huang |
| 9,142,830 B2 | 9/2015 | Xiao et al. |
| 9,153,819 B2 | 10/2015 | Huang et al. |
| 9,160,036 B2 | 10/2015 | Yang et al. |
| 9,172,075 B2 | 10/2015 | Kia et al. |
| 9,287,540 B2 | 3/2016 | Huang |
| 9,324,984 B2 | 4/2016 | Huang et al. |
| 9,331,323 B2 | 5/2016 | Huang |
| 9,346,066 B2 | 5/2016 | Huang |
| 9,350,046 B2 | 5/2016 | Huang |
| 9,362,542 B2 | 6/2016 | Halalay et al. |
| 9,362,551 B2 | 6/2016 | Sachdev et al. |
| 9,362,552 B2 | 6/2016 | Sohn et al. |
| 9,406,971 B2 | 8/2016 | Kia et al. |
| 9,412,986 B2 | 8/2016 | Huang |
| 9,455,430 B2 | 9/2016 | Huang et al. |
| 9,525,600 B1 | 12/2016 | Shen |
| 9,537,144 B2 | 1/2017 | Huang et al. |
| 9,742,028 B2 | 8/2017 | Zhou et al. |
| 9,799,916 B2 | 10/2017 | Halalay et al. |
| 9,865,854 B2 | 1/2018 | Fuller et al. |
| 10,008,749 B2 | 6/2018 | Luski et al. |
| 10,050,313 B2 | 8/2018 | Luski et al. |
| 10,243,241 B2 | 3/2019 | Halalay et al. |
| 10,418,668 B2 | 9/2019 | Wu et al. |
| 2006/0194118 A1 | 8/2006 | Yew et al. |
| 2007/0238001 A1 | 10/2007 | Koyama |
| 2010/0143769 A1 | 6/2010 | Lee et al. |
| 2010/0239900 A1 | 9/2010 | Take et al. |
| 2011/0117413 A1 | 5/2011 | Wang et al. |
| 2011/0151333 A1 | 6/2011 | Halalay et al. |
| 2011/0165459 A1 | 7/2011 | Halalay et al. |
| 2011/0200863 A1 | 8/2011 | Xiao et al. |
| 2012/0007560 A1 | 1/2012 | Smart et al. |
| 2012/0082893 A1* | 4/2012 | Halalay .............. H01M 2/1613 429/216 |
| 2012/0102725 A1 | 5/2012 | Fuller et al. |
| 2012/0156568 A1 | 6/2012 | Kia et al. |
| 2012/0229096 A1 | 9/2012 | Nazri |
| 2012/0231321 A1 | 9/2012 | Huang et al. |
| 2012/0308872 A1 | 12/2012 | Huang |
| 2012/0309860 A1 | 12/2012 | Huang |
| 2012/0315384 A1 | 12/2012 | Abd Elhamid et al. |
| 2013/0004857 A1 | 1/2013 | Kia et al. |
| 2013/0052509 A1 | 2/2013 | Halalay et al. |
| 2013/0071742 A1 | 3/2013 | Halalay et al. |
| 2013/0115519 A1 | 5/2013 | Lee et al. |
| 2013/0130093 A1 | 5/2013 | Wang et al. |
| 2013/0131200 A1 | 5/2013 | Huang |
| 2013/0149588 A1 | 6/2013 | Garsuch et al. |
| 2013/0183582 A1 | 7/2013 | Halalay et al. |
| 2013/0284338 A1 | 10/2013 | Xiao et al. |
| 2013/0319599 A1 | 12/2013 | Huang |
| 2014/0220233 A1 | 8/2014 | Huang et al. |
| 2014/0242452 A1 | 8/2014 | Pieczonka et al. |
| 2014/0272526 A1 | 9/2014 | Huang |
| 2014/0272558 A1 | 9/2014 | Xiao et al. |
| 2015/0014890 A1 | 1/2015 | Xiao |
| 2015/0037651 A1 | 2/2015 | Huang |
| 2015/0056492 A1 | 2/2015 | Huang |
| 2015/0093626 A1 | 4/2015 | Fuller et al. |
| 2015/0093628 A1 | 4/2015 | Halalay et al. |
| 2015/0093639 A1 | 4/2015 | Halalay et al. |
| 2016/0104876 A1 | 4/2016 | Avison et al. |
| 2016/0111721 A1 | 4/2016 | Xiao et al. |
| 2016/0226109 A1 | 8/2016 | Angerbauer et al. |
| 2016/0344035 A1 | 11/2016 | Zhamu et al. |
| 2016/0372788 A1 | 12/2016 | Cheng et al. |
| 2016/0372789 A1 | 12/2016 | Cheng et al. |
| 2017/0155175 A1 | 6/2017 | Halalay et al. |
| 2017/0365882 A1 | 12/2017 | Luski et al. |
| 2017/0365883 A1 | 12/2017 | Luski et al. |
| 2018/0026307 A1 | 1/2018 | Jeon et al. |
| 2019/0013548 A1 | 1/2019 | Halalay et al. |
| 2019/0013552 A1 | 1/2019 | Wu et al. |

FOREIGN PATENT DOCUMENTS

| | | | |
|---|---|---|---|
| CN | 102437371 A | 5/2012 |
| CN | 102447111 A | 5/2012 |
| CN | 102668171 A | 9/2012 |
| CN | 104518190 A | 4/2015 |
| CN | 104638215 A | 5/2015 |
| CN | 105161754 A | 12/2015 |
| CN | 105914401 A | 8/2016 |
| CN | 106816626 A | 6/2017 |
| CN | 107528085 A | 12/2017 |
| CN | 107528086 A | 12/2017 |
| CN | 109216634 A | 1/2019 |
| CN | 109216766 A | 1/2019 |
| DE | 102013218681 A1 | 3/2015 |

(56) References Cited

FOREIGN PATENT DOCUMENTS

| | | |
|---|---|---|
| DE | 102014113894 A1 | 4/2015 |
| DE | 102016122403 A1 | 6/2017 |
| DE | 102017113276 A1 | 12/2017 |
| DE | 102017113282 A1 | 12/2017 |
| DE | 102018116492 A1 | 1/2019 |
| DE | 102018116493 A1 | 1/2019 |
| EP | 1120850 A1 | 8/2001 |
| JP | S59031571 A | 2/1984 |
| JP | H07211351 A | 8/1995 |
| JP | 2015037018 A | 2/2015 |
| WO | 2016104895 A1 | 6/2016 |
| WO | WO-2017120884 A1 | 7/2017 |

OTHER PUBLICATIONS

Ziv, et al. "Manganese Sequestration and Li-Ion Batteries Durability Enhancement by Polymeric 18-Crown-6 Ethers"; Journal of the Electrochemical Society, 161 (9); May 21, 2014; pp. A1213-A1217.
Walkowiak, et al., Macrocycle Carriers for Separation of Metal Ions in Liquid Membrane Process—A Review, Desalination 240, 1999, pp. 186-197.
Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.
Shahrisa, et al., CHemistry of Pyrones, Part 3: New Podands of 4H-Pyran-4-ones; 5 Molecules, 2000, pp. 200-207.
Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel DekkerInc., New York and Basel.
Kaifer, et al., Redox Control of Cation Binding in Macrocyclic Systems; Cation Binding by Macrocycles, 1990, Chapert 8, p. 364, Marcel Dekker Inc., New York and Basel.
Atwood, et al., Cation Complexation by Calizarenes; Cation Binding by Macrocycles, 1990, Chapter 15, pp. 581-582, 587; Marcel Dekker Inc., New York and Basel.
Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.
Vogtle, et al., Crown-ether-complexes and Selectivity; Crown Ethers and Analogs, 1989, Chapter 4, pp. 208-215, John Wiley and Sons, New York.
Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.
Arora, et al., Battery Separators, Chem. Rev. 104, 2004, pp. 4419-4462.
"Teijin Develops More Heat-Resistant Li-Ion Battery Separator", Trading Markets.Com, Sep. 10, 2009, 3 pages, http://www.tradingmarkets.com.
Plastics Today Staff, "TonenGeneral and Toray team up to create lithium-ion battery separator films", plasticstoday.com, Nov. 4, 2009, 2 pages, http://www.plasticstoday.com.

Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.
Babb, D. A., "Synthesis and Metal Ion Complexation of Synthetic Ionophores," A Ph.D. Dissertation in Chemistry, Texas Tech University, Dec. 1985, 149 pages.
Manecke, G., et al., "Polymere Kryptanden, 1", Makromol. Chem. 182, 1973-1984, (1981).
Kopolow, S., et al., "Polyvinyl macrocyclic polyethers). Synthesis and Cation Binding. Properties", vol. 6, No. 1, Jan.-Feb. 1973, pp. 133-142.
Smid, J., et al., "Synthesis of 4'-Vinylbenzocrown Ethers", Organic Preparations and Procedures Int. 8(4), 1976, pp. 193-196.
Banerjee, et al.; "Increasing the durability of Li-ion batteries by means of manganese ion trapping materials with nitrogen functionalities"; Journal of Power Sources 341 (2017); pp. 457-465.
Banerjee, et al.; "Multifunctional Manganese Ions Trapping and Hydrofluoric Acid Scavenging Separator for Lithium Ion Batteries Based on Poly (ethylene-alternate-maleic acid) Dilithium Salt"; Advanced Energy Materials; 2016; 9 pages.
Halalay et al.; U.S. Appl. No. 15/644,436, filed Jul. 7, 2017 entitled "Iron Ion Trapping Van Der Waals Gripper Additives for Electrolyte Systems in Lithium-Ion Batteries"; 54 pages.
Luski et al.; U.S. Appl. No. 15/186,526, filed Jun. 19, 2016 entitled "Lithium Ion Battery"; 74 pages.
Luski et al.; U.S. Appl. No. 15/186,525, filed Jun. 19, 2016 entitled "Lithium Ion Battery"; 65 pages.
Wu et al.; U.S. Appl. No. 15/644,444, filed Jul. 7, 2017 entitled "Electrolyte System Suppressing or Minimizing Metal Contaminants and Dendrite Formation in Lithium Ion Batteries"; 45 pages.
First Office Action for Chinese Patent Application No. 201710434173.8 dated Feb. 22, 2019 with English language machine translation, 28 pages.
First Office Action for Chinese Patent Application No. 201710434249.7 dated Feb. 22, 2019 with English language machine translation, 21 pages.
Butler, Alison et al., "Iron(III)-siderophore coordination chemistry: Reactivity of marine siderophores," Coord Chem Rev. 2010, 254 (3-4), pp. 288-296 (Published Feb. 1, 2010); doi:10.1016/j.ccr.2009.09.010.
First Office Action for Chinese Patent Application No. 201410642253.9 dated May 24, 2016 with English language machine translation, 15 pages.
First Office Action for Chinese Patent Application No. 201611028544.4 dated Oct. 17, 2018 with correspondence from China Patent Agent H.K. Ltd. dated Oct. 19, 2018 summarizing contents, 9 pages.
Plichta et al. "A low-temperature electrolyte for lithium and lithium-ion batteries," Journal of Power Sources, 88 (200), pp. 192-196.
Wikipedia contributors. "Ionophore." Wikipedia, The Free Encyclopedia. Wikipedia, The Free Encyclopedia, Aug. 30, 2012. Web. Mar. 20, 2018. (Year: 2012).
Wikipedia contributors. "Siderophore." Wikipedia, The Free Encyclopedia. Wikipedia, The Free Encyclopedia, Aug. 16, 2012. Web. Mar. 20, 2018. (Year: 2012).
Scientific and Technical Information Center (STIC) search results from Sam Darwish, Oct. 15, 2018 (Year: 2018).

\* cited by examiner

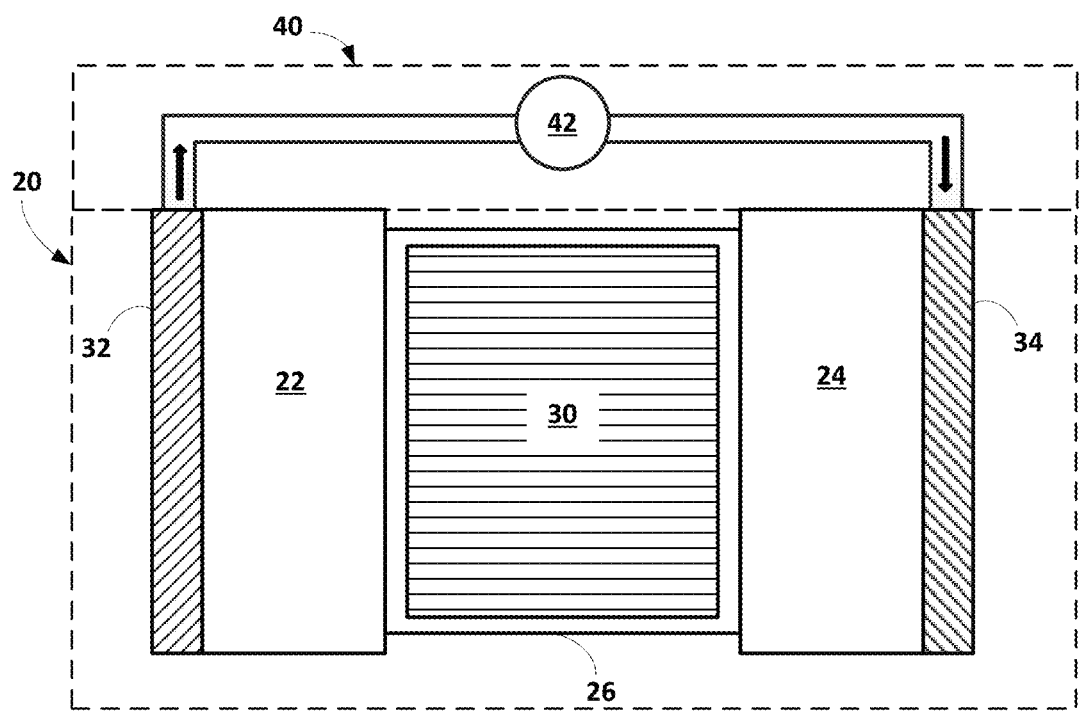

POLYMERIC ION TRAPS FOR SUPPRESSING OR MINIMIZING TRANSITION METAL IONS AND DENDRITE FORMATION OR GROWTH IN LITHIUM-ION BATTERIES

INTRODUCTION

This section provides background information related to the present disclosure which is not necessarily prior art.

The present disclosure relates to polymeric ion traps that suppress or minimize transition metal ions and dendrite formation or growth within an electrochemical cell and improves performance thereof.

High-energy density, electrochemical cells, such as lithium-ion batteries can be used in a variety of consumer products and vehicles, such as Hybrid Electric Vehicles (HEVs) and Electric Vehicles (EVs). Typical lithium-ion batteries comprise a first electrode, a second electrode, an electrolyte material, and a separator. One electrode serves as a positive electrode or cathode and another serves as a negative electrode or anode. A stack of lithium-ion battery cells may be electrically connected to increase overall output. Conventional rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. The electrolyte typically contains one or more lithium salts, which may be dissolved and ionized in one or more non-aqueous solvents. The negative electrode generally includes a lithium insertion material or an alloy host material. Typical electroactive materials for forming an anode include lithium-graphite intercalation compounds, lithium-silicon compounds, lithium-tin alloys, and lithium titanate $Li_{4+x}Ti_5O_{12}$, where $0 \le x \le 3$, such as $Li_4Ti_5O_{12}$ (LTO). The positive electrode generally includes an electroactive material which can be intercalated or alloyed with lithium ions, which may comprise one or more transition metals, such as manganese, nickel, cobalt, chromium, iron, vanadium, and combinations thereof. Such active materials may include, by way of non-limiting example, lithium-transition metal oxides or mixed oxides of the spinel type, for example including spinel lithium manganese oxide ($LiMn_2O_4$), $LiCoO_2$, $LiNiO_2$, $LiMn_{1.5}Ni_{0.5}O_4$, $LiNi_{(1-x-y)}Co_xM_yO_2$ (where $0<x<1$, $0<y<1$, and M may be Al, Mn, or the like), or lithium iron phosphates.

In a variety of instances, transition metal ion contaminants (e.g., iron (Fe), chromium (Cr), nickel (Ni), copper (Cu), zinc (Zn), tin (Sn)) may be present in the lithium-ion battery. For example, stainless steel or brass fines, which wears or separates from battery fabrication equipment, may ingress into the inter-electrode space during battery manufacture. These metal particles can then be readily dissolved in the acidified lithium-ion battery electrolyte and provide a high local concentration of certain metals, such as iron (Fe), chromium (Cr), nickel (Ni) from stainless steel or copper (Cu) and zinc (Zn) from brass. These contaminants thus have the potential to provide a continuing localized supply of such transition metal ions, which can be directed towards a localized area of the negative electrode and potentially grow a dendrite. The metal dendrites may form sharp protrusions that potentially puncture the separator and cause an internal short circuit, which may cause cell self-discharge or catastrophic cell failure through thermal runaway. Accordingly, it would be desirable to develop materials for use in high energy lithium-ion batteries that reduce or suppress metal dendrite formation.

SUMMARY

This section provides a general summary of the disclosure, and is not a comprehensive disclosure of its full scope or all of its features.

In various aspects, the present disclosure provides an exemplary electrochemical cell that cycles lithium ions. The electrochemical cell may include a positive electrode, a negative electrode, a microporous polymeric separator, and one or more transition metal ion trapping moieties. The positive electrode may include a positive lithium-based electroactive material and one or more polymeric binder materials. The negative electrode may include a negative electroactive material. The microporous polymeric separator may be disposed between the positive electrode and the negative electrode. The at least one transition metal ion trapping moiety may include one or more polymers functionalized with one or more trapping groups. The one or more trapping groups may be selected from the group consisting of: ortho-phenanthroline, malonates, fumarates, succinates, and combinations thereof. The one or more trapping groups may bind to at least one transition metal ion within the electrochemical cell to minimize or suppress formation of dendrite protrusions on the negative electrode.

In one variation, the at least one transition metal ion-trapping moiety is included in one or more of the following: a) coated on a surface of the positive electrode; b) coated on a surface of the negative electrode; c) coated on a surface of the separator; d) coated on one or more pore surfaces of the separator; or e) grafted as a substitute pendant group onto one or more polymers forming the microporous polymeric separator.

In one variation, the electrochemical cell may further include an electrolyte system. The electrolyte system may include the at least one transition metal ion-trapping moiety and may conduct lithium ions. The electrolyte system may be soaked into at least one of the positive electrode, the negative electrode, and the separator.

In one variation, the electrolyte system includes one or more lithium salts and one or more solvents. The one or more lithium salts may be selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis (trifluoromethanesulfonimide) ($LiN(CF_3SO_2)_2$); lithium fluorosulfonylimide ($LiN(FSO_2)_2$); and combinations thereof. The one or more solvents may be selected from the group consisting of: cyclic carbonates, acyclic carbonates, aliphatic carboxylic esters, γ-lactones, chain structure ethers, cyclic ethers, and combinations thereof.

In one variation, the negative electroactive material of the negative electrode may include one or more of the following: graphite, lithium titanate, silicon, silicon-carbon composites, silicon oxides, or tin oxides. The positive lithium-based electroactive material of the positive electrode may include one or more of the following: spinel lithium manganese oxide; lithium cobalt oxide; lithium iron phosphate; lithium manganese phosphate; lithium vanadium phosphate; binary combinations of lithium iron phosphate, lithium manganese phosphate, or lithium vanadium phosphate; a lithium binary oxide of two elements selected from manganese (Mn), nickel (Ni), and cobalt (Co); or a lithiated ternary oxide of manganese (Mn), nickel (Ni), and cobalt (Co).

In one variation, the one or more polymer binder material may be selected from the group consisting of: vinylbenzene-styrene copolymer, polyvinylidene fluoride (PVdF), ethylene polypropylene diene monomer rubber (EPDM), carboxymethyl cellulose (CMC), lithium salt of polyacrylic acid (LiPAA), lithium salt of sodium alginate, lithium salt of lithium alginate, and combinations thereof.

In one variation, the malonates may be polymer-bound sodium (Na) or lithium (Li) salts of malonic acid. The fumarates may be polymer-bound sodium (Na) or lithium (Li) salts of fumaric acid. The succinates may be polymer-bound sodium (Na) or lithium (Li) salts of succinic acid.

In one variation, the electrochemical cell may include the at least one transition metal ion-trapping moiety in an amount greater than or equal to about 5 weight % of a weight of the separator to less than or equal to about 50 weight % of the weight of the separator.

In one variation, the transition metal ions may include iron (Fe) ions, nickel (Ni) ions, cobalt (Co) ions, chromium (Cr) ions, copper (Cu) ions, zinc (Zn) ions, tin (Sn), or combinations thereof, which may arise from metal (e.g., stainless steel or brass) fines that ingress the inter-electrode space during battery manufacture.

In other aspects, the present disclosure provides another exemplary electrochemical cell that cycles lithium ions. The electrochemical cell may include a positive electrode, a negative electrode, a microporous polymeric separator, an electrolyte system, and at least one transition metal ion trapping moiety. The positive electrode may include a positive lithium-based electroactive material and one or more polymeric binder materials. The negative electrode may include a negative electroactive material. The microporous polymeric separator may be disposed between the positive electrode and the negative electrode. The electrolyte system may be soaked or disposed within at least one of the positive electrode, the negative electrode, and the separator. The at least one transition metal ion-trapping moiety may include one or more polymers functionalized with one or more trapping groups. The one or more trapping groups may be selected from the group consisting of: ortho-phenanthroline, malonates, fumarates, succinates, and combinations thereof. The one or more trapping groups may bind to iron (Fe) ions within the electrochemical cell to minimize or suppress the aggregation of the iron (Fe) ions. The negative electrode has a surface that is substantially free of protruding dendrites.

In one variation, the at least one transition metal ion-trapping moiety may be included in one or more of the following: a) coated on a surface of the positive electrode; b) coated on a surface of the negative electrode; c) coated on a surface of the separator; d) coated on one or more pore surfaces of the separator; or e) grafted as a substitute pendant group onto one or more polymers forming the microporous polymeric separator.

In one variation, the electrochemical cell may include the at least one transition metal ion-trapping moiety in an amount greater than or equal to about 5 weight % of a weight of the separator to less than or equal to about 50 weight % of the weight of the separator.

In one variation, the malonates may be polymer-bound sodium (Na) or lithium (Li) salts of malonic acid. The fumarates may be polymer-bound sodium (Na) or lithium (Li) salts of fumaric acid. The succinates may be polymer-bound sodium (Na) or lithium (Li) salts of succinic acid.

In other aspects, the present disclosure provides a method of suppressing or minimizing dendrite formation to improve the cycling performance and capacity retention in an electrochemical cell that cycles lithium ions. The method may include introducing at least one transition metal ions trapping moiety into the electrochemical cell. The at least one transition metal ion-trapping moiety may include one or more polymers functionalized with one or more trapping groups. The one or more trapping groups may be selected from the group consisting of: crown ethers, siderophores, ortho-phenanthroline, iminodiacetic acid dilithium salt, oxalates, malonates, fumarates, succinates, itaconates, phosphonates, and combinations thereof. After introducing the at least one transition metal ion-trapping group, the one or more trapping groups of the transition metal ion-trapping group may bind to iron (Fe) ion contaminants within the electrochemical cell to minimize or suppress aggregation of the iron (Fe) ion contaminants and formation of dendrite protrusions therein.

In one variation, the electrochemical cell may further include a positive electrode, a negative electrode, and a microporous polymeric separator. The positive electrode may include a positive lithium-based electroactive material and a polymer binder material. The negative electrode may include a negative electroactive material. The microporous polymeric separator may be disposed between the positive electrode and the negative electrode.

In one variation, the at least one transition metal ion-trapping moiety may be included in one or more of the following: a) coated on a surface of the positive electrode; b) coated on a surface of the negative electrode; c) coated on a surface of the separator; d) coated on one or more pore surfaces of the separator; or e) grafted as a substitute pendant group onto one or more polymers forming the microporous polymeric separator.

In one variation, the one or more trapping groups bound to iron (Fe) ion contaminants may form a deposited material on one or more exposed surface regions of the negative electrode. The deposited material may have an exposed surface that is substantially free of dendrite protrusions.

In one variation, the one or more trapping groups bound to iron (Fe) ion contaminants may sequester iron (Fe) ion contaminants preventing movement of the iron (Fe) ion contaminant to or towards the negative electrode.

In one variation, the crown ethers of the one or more trapping groups may be selected from the group consisting of: 1,7-dialkyldiaza-12-crown-4; 1,4,13-trioxa-7,10-dialkyl-7,10-diazacyclopentadecane; 1,4,10,13-tetraoxa-7,16-dialkyl-7,16-diazacyclooctadecane; 7,16-di(alkylbenzyl)-1,4,10,13-tetra-7,16-diazacyclooctadecane; 3,11-dialkyl-3,11-diaza-1,5,9,13-tetrathiacyclohexadecane; 3,11,19-trialkyl-3,11,19-triaza-1,5,9,13,17,21-hexathiacyclotetracosane; 1,4,7-trialkyl-1,4,7-triazacyclononane; 1,5,9-trialkyl-1,5,9-triazacyclododecane; tetraalkylcyclen; 1,4,8,11-tetraalkyl-1,4,8,11-tetraazacyclotetradecane; hexaalkylhexacyclen; and combinations thereof. The siderophores of the one or more trapping groups may be selected from the group consisting of: ferrichrome, desferriozamine, desferrioxamine B, desferrioxamine E, fusarinine C, ornibactin, rhodotorulic acid, enterobactin, bacillibactin, bicriobactin, azotobactin, pyoverdine, and combinations thereof. The oxalates of the one or more trapping groups may be polymer-bound alkali metal (e.g., lithium (Li), sodium (Na), potassium (K), cesium (Cs)) salts of oxalates acids. The malonates of the one or more trapping groups may be polymer-bound sodium (Na) or lithium (Li) salts of malonic acid. The fumarates of the one or more trapping groups may be polymer-bound sodium (Na) or lithium (Li) salts of fumaric acid. The succinates of the one or more trapping group may be polymer-bound sodium (Na) or lithium (Li) salts of succinic acid. The itaconates may be polymer-bound alkali metal (e.g., lithium (Li), sodium (Na), potassium (K), cesium (Cs)) salts of itaconic acid. The phosphonates may be polymer-bound alkali metal (e.g., lithium (Li), sodium (Na), potassium (K), cesium (Cs)) salts of phosphonic acid.

Further areas of applicability will become apparent from the description provided herein. The description and specific examples in this summary are intended for purposes of illustration only and are not intended to limit the scope of the present disclosure.

DRAWING

The drawing described herein is for illustrative purposes only of selected embodiments and not all possible implementations, and is not intended to limit the scope of the present disclosure.

The FIGURE is a schematic of an exemplary electrochemical battery cell including one or more transition metal ion-trapping moiety.

Corresponding reference numerals indicate corresponding parts throughout the drawing.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the FIGURE. Spatially or temporally relative terms may be intended to encompass different orientations of the device or system in use or operation in addition to the orientation depicted in the FIGURE.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

The disclosure of all patents, patent applications, articles, and literature referenced or cited in this disclosure are hereby incorporated by reference herein.

Example embodiments will now be described more fully with reference to the accompanying drawing.

The present technology pertains to improved electrochemical cells, especially lithium-ion batteries, which may be used in vehicle applications. However, the present technology may also be used in other electrochemical devices, especially those that include lithium ions.

An exemplary and schematic illustration of a lithium-ion battery 20 is shown in the FIGURE. Lithium-ion battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of cyclable lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to form intercalated or alloyed lithium at the positive electrode 24. The electric current passing through the external circuit 18 can be harnessed and directed through the load device 42 until the intercalated lithium in the negative electrode 22 is depleted and the capacity of the lithium-ion battery 20 is diminished.

The lithium-ion battery 20 can be charged or re-energized at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical series and/or parallel arrangement to provide a suitable electrical energy and power package.

Furthermore, the lithium-ion battery 20 can include a variety of other components that while not depicted here are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and power if it is required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

With renewed reference to the FIGURE, any appropriate electrolyte 30, whether in solid form or solution, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. A non-limiting list of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium fluorosulfonylimide ($LiN(FSO_2)_2$); and combinations thereof.

The present technology is particularly suitable for use with an electrolyte that includes $LiPF_6$ salt. These and other similar lithium salts may be dissolved in a variety of organic solvents, including but not limited to various alkyl carbonates, such as cyclic carbonates (e.g., ethylene carbonate (EC), propylene carbonate (PC), butylene carbonate(BC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), and combinations thereof.

The porous separator 26 may include, in instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26.

The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, and/or combinations thereof.

The polyolefin layer, and any other optional polymer layers, may further be included in the microporous polymer separator 26 as a fibrous layer to help provide the microporous polymer separator 26 with appropriate structural and porosity characteristics. Thus, the nanoporous or microporous membrane 26 may contain a single layer or a multilayer laminate fabricated from either a dry or wet process, by solvent casting, by a non-woven fiber laying process, or by any other process for making a nanoporous or microporous membrane 26 with properties suitable for application in Li-ion batteries. For example, in one example, a single layer of the polyolefin may constitute the entirety of the separator membrane 26. In another example, a single layer of one or a combination of any of the polymers from which the separator 26 may be formed (e.g., the polyolefin and/or one or more of the other polymers listed above for the separator 26) may constitute the entirety of the separator 26.

As another example, however, multiple discrete layers of similar or dissimilar polyolefins and/or polymers for the separator 26 may be assembled into the separator 26. In one example, a discrete layer of one or more of the polymers may be coated on a discrete layer of the polyolefin for the separator 26. Further, the polyolefin (and/or other polymer) layer, and any other optional polymer layers, may further be included in the separator 26 as a fibrous layer to help provide the separator 26 with appropriate structural and porosity characteristics. A more complete discussion of single and multi-layer lithium-ion battery separators, and the dry and wet processes that may be used to make them, can be found in P. Arora and Z. Zhang, "Battery Separators," *Chem. Rev.*, 104, 4424-4427 (2004).

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

In various aspects, the negative electrode 22 includes an electroactive material as a lithium host material capable of functioning as a negative terminal of a lithium-ion battery.

The negative electrode 22 may thus include the electroactive lithium host material and optionally another electrically conductive material, as well as one or more polymeric binder materials to structurally hold the lithium host material together. For example, in one embodiment, the negative electrode 22 may include an active material including graphite, silicon (Si), tin (Sn), or other negative electrode particles intermingled with a binder material selected from the group consisting of: polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate, and combinations thereof, by way of non-limiting example. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO).

The present technology is particularly suitable for use with negative electrode materials for the negative electrode 22 that includes graphite materials. Such graphite materials may of course be combined with other electroactive materials. The principles of the present teachings may likewise be advantageous for use with other negative electrode materials, such as those containing silicon or tin, in certain alternative variations. The negative electrode current collector 32 may be formed from copper or any other appropriate electrically conductive material known to those of skill in the art.

The positive electrode 24 may be formed from a lithium-based active material that can sufficiently undergo lithium intercalation and deintercalation or alloying and dealloying, while functioning as the positive terminal of the lithium-ion battery 20. The positive electrode 24 may include a polymeric binder material to structurally fortify the lithium-based active material. The positive electrode 24 electroactive materials may include one or more transition metals, such as manganese (Mn), nickel (Ni), cobalt (Co), chromium (Cr), iron (Fe), vanadium (V), and combinations thereof.

Two exemplary common classes of known electroactive materials that can be used to form the positive electrode 24 are lithium transition metal oxides with layered structure and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$(LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide (e.g., $LiMn_{1/3}Ni_{1/3}Co_{1/3}O_2$).

Such active materials may be intermingled with an optional electrically conductive material and at least one polymeric binder, for example, by slurry casting active materials and optional conductive materials with such binders, like polyvinylidene difluoride (PVdF), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum or any other appropriate electrically conductive material known to those of skill in the art.

In a variety of instances, the lithium-ion battery 20 may include transition metal (e.g., iron (Fe), copper (Cu), tin (Sn), chromium (Cr), nickel (Ni), zinc (Zn)). For example, very fine metal particles (e.g., having an average particle size of about 1 μm to about 20 μm) ingress during manufacturing into the battery environment. These dissolve fairly readily in an acidified electrolyte system 30 and a localized stream of transition metal ions can move under the influence of the internal electric field to the negative electrode 22 in a region directly opposite to the metal particle to grow a whisker-like dendrite structure.

In various aspects, the present disclosure provides methods of minimizing or suppressing dendrite formation by preventing movement of the contaminant or contaminants to or towards the negative electrode 22. The electrochemical cell 20 includes one or more transition metal ion trapping moieties that bind to transition metal ions throughout the electrochemical cell 20 consequently minimizing or suppressing dendrite formation so that surfaces within the electrochemical cell 20 are substantially free of protruding dendrites. Reducing or minimizing dendrite formation improves the durability and abuse tolerance of the electrochemical cell 20 and provides a more robust cell manufacturing process reducing the susceptibility to impurities or contaminants.

The at least one transition metal ion-trapping moiety may be included in one or more of the following within the electrochemical cell 20: (a) coated on a surface of the positive electrode 24; (b) coated on a surface of the negative electrode 22; (c) coated on a surface of the separator 26; (d) coated on one or more pore surfaces of the separator; or (e) grafted as a substitute pendant group onto one or more polymers comprising the microporous polymeric separator 26. In certain aspects, the polymers functionalized with trapping groups that form the transition metal ion trapping moiety may be provided in the form of nanoparticles, for example, as nanospheres. The nanoparticles may be disposed on the positive electrode 24, on the negative electrode 22, and within or on the separator 26. In other instances, the at least one transition metal ion-trapping moiety may be included in the electrolyte system 30. As noted, the electrolyte system 30 may be soaked into one or more of the positive electrode 24, the negative electrode 22, and the separator 26.

In various instances, such as when the at least one transition metal ion-trapping moiety is coated on one or more pore surfaces of the separator, the electrochemical cell 20 may include an amount of the at least on transition metal ion trapping moiety that is greater than or equal to about 5 weight percent (%) of a weight of the separator 26 to less than or equal to about 50 weight percent (%) of the weight the separator 26, optionally the electrochemical cell 20 may include an amount of the at least on transition metal ion trapping moiety that is greater than or equal to about 10 weight percent (%) of a weight of the separator 26 to less than or equal to about 50 weight percent (%) of the weight the separator 26. In other instances, such as when the at least one transition metal ion-trapping moiety coats one or more surfaces of the positive electrode 24, the negative electrode 22, of the separator 26, the electrochemical cell 20 may include transition metal ion-trapping moiety coats having a thickness greater than or equal to about 1 μm to less than or equal to about 5 μm and a porosity greater than or equal to about 25% to less than or equal to about 75%.

The at least one transition metal ion-trapping moiety may include one or more polymers functionalized with one or more trapping groups. In various instances, the one or more polymers may be selected from the group consisting of: vinylbenzene-styrene copolymer, polyvinylidene fluoride (PVdF), ethylene polypropylene diene monomer rubber (EPDM), carboxymethyl cellulose (CMC), lithium salt of polyacrylic acid (LiPAA), lithium salt of sodium alginate, lithium salt of lithium alginate, and combinations thereof. The one or more trapping groups may include alkali metal salts (e.g., malonate) which can capture a transition metal ions though ion exchange, or a compound including covalent bonds that may complex with transition metal cations. For example, the one or more trapping groups may be selected from the group consisting of: azacrown ethers, crown ethers, siderophores, bactin siderophores, orthophenanthroline, bidentates, oxalates, malonates, fumarates, succinates, itaconates, phosphonates, phosphates, and combinations thereof. In certain instances, the at least one transition metal ion-trapping moiety may be formed prior to incorporation or inclusion within the electrochemical cell 20. In other instances, the at least one transition metal ion-trapping moiety may result from reactions within the electrochemical cell 20.

In certain variations, the one or more trapping groups may include one or more crown ethers. Crown ethers are cyclic ethers in which the ether ring includes oxygen atoms that may complex with transition metal cations. The at least one crown ether may be selected from the group consisting of: 1,7-dialkyldiaza-12-crown-4; 1,4,13-trioxa-7,10-dialkyl-7,10-diazacyclopentadecane; 1,4,10,13-tetraoxa-7,16-dialkyl-7,16-diazacyclooctadecane; 7,16-di(alkylbenzyl)-1,4,10,13-tetra-7,16-diazacyclooctadecane; 3,11-dialkyl-3,11-diaza-1,5,9,13-tetrathiacyclohexadecane; 3,11,19-trialkyl-3,11,19-triaza-1,5,9,13,17,21-hexathiacyclotetracosane; 1,4,7-trialkyl-1,4,7-triazacyclononane; 1,5,9-trialkyl-1,5,9-triazacyclododecane; tetraalkylcyclen; 1,4,8,11-tetraalkyl-1,4,8,11-tetraazacyclotetradecane; hexaalkylhexacyclen; and combinations thereof.

In certain variations, the one or more trapping groups may include at least one siderophore. Certain siderophores may preferentially form stable, hexadentate, octahedral complexes with cations like $Fe^{3+}$. Highly effective siderophores may have three bidentate ligands per molecule forming a hexadentate complex with the iron cation. Typically siderophores are classified by the ligands used to chelate the iron ions. The siderophore may include a ligand (or be a derivative of a ligand) selected the group consisting of:

a catecholate comprising a phenolate $C_6H_5(OH)$-group generally represented by the structure

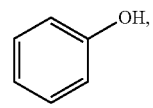

a hydroxamate comprising a $N(OH)C(=O)C$-group generally represented by the structure

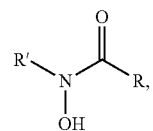

a carboxylate comprising a $H_3C(OH)C(=O)$-group represented by the structure

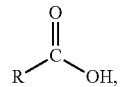

or a mixed ligand. For example, the catecholate siderophores may be selected from the group consisting of: enterobactin, bacillibactin, vibriobactin, and combinations thereof. The hydroxamate siderophores may be selected from the group consisting of: ferrichrome, desferrioxamine, desferrioxamine B, desferrioxamine E, fusarinine C, ornibactin, rhodotorulic acid, and combinations thereof. In certain variations, the carboxylate siderophores may be derivatives of citric acid. The mixed ligand siderophores are optionally selected from the group consisting of: azotobactin, pyoverdine, and combinations thereof.

In certain variations, the one or more trapping groups may include one or more bactin siderophores. Bactins are generated by microbes to capture iron cations. In certain variations, the bactin siderophore may be selected from the representative group consisting of: ferrichrome, desferriozamine, desferrioxamine B, desferrioxamine E, fusarinine C, ornibactin, rhodotorulic acid, enterobactin, amphientero-bactin, bacillibactin, bicriobactin, azotobactin, pyoverdine, agrobactin, aerobactin, yersiniabactin, salmochelin, rhizobactin, vibriobactin, azotobactin, pyoverdine, and combinations thereof.

In certain variations, the one or more trapping groups may include one or more oxalates. The oxalates may be polymer-bound alkali metal (e.g., lithium (Li), sodium (Na), potassium (K), cesium (Cs)) salts of oxalates acid. In certain variations, the one or more trapping groups may include one or more malonates. The malonates may be polymer-bound sodium (Na) or lithium (Li) salts of malonic acid. In certain variations, the one or more trapping groups may include one or more fumarates. The fumarates may be polymer-bound sodium (Na) or lithium (Li) salts of fumaric acid. In certain variations, the one or more trapping groups may include one or more succinates. The succinates may be polymer-bound sodium (Na) or lithium (Li) salts of succinic acid. In certain variations, the one or more trapping groups may include one or more itaconates. The itaconates may be polymer-bound alkali metal (e.g., lithium (Li), sodium (Na), potassium (K), cesium (Cs)) salts of itaconic acid. In certain variations, the one or more trapping groups may include one or more bidentates. The bidentates may be polymer-bound alkali metal (e.g., lithium (Li), sodium (Na), potassium (K), cesium (Cs)) salts of organic acids. For example only, the bidentates may include iminodiacetic acid dilithium salt. In certain variations, the one or more trapping groups may include one or more phosphonates. The phosphonates may be polymer-bound alkali metal (e.g., lithium (Li), sodium (Na), potassium (K), cesium (Cs)) salts of phosphonic acid.

In other instances, the one or more trapping agents may be selected from the group consisting of: ortho-phenanthroline, malonates, fumarates, succinates, and combinations thereof. In such instances, the malonates may be polymer-bound sodium (Na) or lithium (Li) salts of malonic acid. The fumarates may be polymer-bound sodium (Na) or lithium (Li) salts of fumaric acid. The succinates may be polymer-bound sodium (Na) or lithium (Li) salts of succinic acid.

In still other instances, the one or more trapping agents may be selected from the group consisting of alkali (e.g., lithium (Li), sodium (Na), potassium (K), cesium (Cs)) salts of: glutaric acid; succinic acid; poly(ethylene-alt-maleic acid); malonic acid; undecylenic acid; tricarballylic acid; 1,2,3,4-tetracarboxylic acid; acrylic acid; methacrylic acid; fumaric acid; glutaconic acid; citric acid; thiomalate; ethylenediaminetriacetic acid acetamide; 3,3'-thiodiproprionic acid; ethylenediaminetetracetic acid monoamide; iminodiacatate; copolymers chitosan and iminodiacetate; copolymers methyl vinyl ether and maleic acid; copolymers ethylene and acrylic acid; copolymers ethylene and methacrylic acid; and combinations thereof.

In still other instances, the one or more trapping agents may be selected from the group consisting of: 4-dimethylamino pyridine; triphenylphosphine; 2-mercaptoethylamine; bipyridine; diethylenetrialkyltriamine; dimethylamine; benzyldiphenylphosphine; dibutylphenylphosphine; tris(2-aminoethyl)pentalkylamine); methylsulfanylalkyl; pyridine; trialkylethylenediamine; bis [(diphenylphosphonyl)methyl] amine; (4-hydroxyphenyl)diphenylphosphine; diethylaminomethyl; poly(4-vinylpyridine-co-butyl methacrylate); poly(2-vinylpyridine-co-styrene); poly(4-vinylpyridine-co-styrene); and combinations thereof.

In various aspects, the at least one transition metal ion-trapping moiety binds with metal ions throughout the lithium-ion battery 20 to minimize or suppress dendrite formation that may result from transition metal ions migrating within the lithium-ion battery 20. Sources of ions may include one or more transition metal elements such as iron (Fe), copper (Cu), tin (Sn), chromium (Cr), nickel (Ni), manganese (Mn), molybdenum (Mo), cobalt (Co), zinc (Zn), or other such metal elements and metal alloys thereof. Thus, the metal elements may result from stainless steel interfusion during the cell manufacturing process or from the lithium-based active material of the positive electrode.

In other instances, such as when the at least one transition metal ion-trapping moiety is bound to a component of the electrochemical cell 20, for example, one or more of the positive or negative electrodes 22, 24 or separator 26, the one or more trapping groups of the at least one transition metal ion-trapping moiety bound to one or more transition metal ions (e.g., iron (Fe)) may sequester the transition metal ion preventing or limiting the movement of the ions to or towards the negative electrode 22. Thus, the at least one transition metal ion-trapping moiety retains the one or more transition metal ions in situ preventing accumulation on or at the negative electrode 22. For example only, the at least one transition metal ion-trapping moiety may be incorporated within the electrochemical cell 20 as a pore component within the separator 26. In such instances, the one or more trapping groups may capture or complex with iron (Fe) ions to tether or sequester the ions to the pores walls of the separator 26 preventing subsequent movement of the ions in the inter-electrode space.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium ions having improved capacity retention comprising:
    a positive electrode comprising a positive lithium-based electroactive material and one or more polymeric binder materials;
    a negative electrode comprising a negative electroactive material;
    a microporous polymeric separator disposed therebetween; and
    at least one transition metal ion-trapping moiety comprising one or more polymers functionalized with one or more trapping groups selected from the group consisting of: ortho-phenanthroline, malonates, fumarates, succinates, and combinations thereof, wherein the one or more trapping groups bind to at least one transition metal ion within the electrochemical cell to minimize or suppress formation of dendrite protrusions on the negative electrode.

2. The electrochemical cell of claim 1, wherein the at least one transition metal ion-trapping moiety is included in one or more of the following:
    a) coated on a surface of the positive electrode;
    b) coated on a surface of the negative electrode;
    c) coated on a surface of the separator;
    d) disposed in pores of the positive electrode as a pore filler;
    e) mixed with the polymeric binder materials of the positive electrode;
    f) disposed in pores of the separator as a pore filler; or
    g) grafted as a substitute pendant group onto one or more polymers forming the microporous polymeric separator.

3. The electrochemical cell of claim 1, further comprising an electrolyte system, wherein the electrolyte system comprises the at least one transition metal ion-trapping moiety and conducts lithium ions and the electrolyte system is soaked into at least one of the positive electrode, the negative electrode, or the separator.

4. The electrochemical cell of claim 3, wherein the electrolyte system further comprises:
one or more lithium salts selected from the group consisting of: lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium fluorosulfonylimide ($LiN(FSO_2)_2$); and combinations thereof; and
one or more solvents selected from the group consisting of: cyclic carbonates, acyclic carbonates, aliphatic carboxylic esters, γ-lactones, chain structure ethers, cyclic ethers, and combinations thereof.

5. The electrochemical cell of claim 1, wherein the negative electroactive material of the negative electrode includes one or more of the following: graphite, lithium titanate, silicon, silicon-carbon composites, silicon oxides, or tin oxides; and
the positive lithium-based electroactive material of the positive electrode includes one or more of the following: spinel lithium manganese oxide; lithium cobalt oxide; lithium iron phosphate; lithium manganese phosphate; lithium vanadium phosphate; binary combinations of lithium iron phosphate, lithium manganese phosphate, or lithium vanadium phosphate; a lithium binary oxide of two elements selected from manganese (Mn), nickel (Ni), and cobalt (Co); or a lithiated ternary oxide of manganese (Mn), nickel (Ni), and cobalt (Co).

6. The electrochemical cell of claim 1, wherein the one or more polymer binder materials is selected from the group consisting of: vinylbenzene-styrene copolymer, polyvinylidene fluoride (PVdF), ethylene polypropylene diene monomer rubber (EPDM), carboxymethyl cellulose (CMC), lithium salt of polyacrylic acid (LiPAA), lithium salt of sodium alginate, lithium salt of lithium alginate, and combinations thereof.

7. The electrochemical cell of claim 1, wherein the malonates are polymer-bound sodium (Na) or lithium (Li) salts of malonic acid; the fumarates are polymer-bound sodium (Na) or lithium (Li) salts of fumaric acid; and the succinates are polymer-bound sodium (Na) or lithium (Li) salts of succinic acid.

8. The electrochemical cell of claim 1, wherein the electrochemical cell includes the at least one transition metal ion-trapping moiety in an amount greater than or equal to about 5 weight % of a weight of the separator to less than or equal to about 50 weight % of the weight of the separator.

9. The electrochemical cell of claim 1, wherein the at least one transition metal ion includes iron (Fe) ions, nickel (Ni) ions, cobalt (Co) ions, chromium (Cr) ions, copper (Cu) ions, zinc (Zn) ions, tin (Sn), or combinations thereof.

10. An electrochemical cell that cycles lithium ions having improved capacity retention comprising:
a positive electrode comprising a positive lithium-based electroactive material and one or more polymeric binder materials;
a negative electrode comprising a negative electroactive material;
a microporous polymeric separator disposed therebetween
an electrolyte system disposed within at least one of the positive electrode, negative electrode, and separator; and
at least one transition metal ion-trapping moiety comprising one or more polymers functionalized with one or more trapping groups selected from the group consisting of: ortho-phenanthroline, malonates, fumarates, succinates, and combinations thereof, wherein the one or more trapping groups bind to iron (Fe) ions within the electrochemical cell to minimize or suppress aggregation of the iron (Fe) ions and a surface of the negative electrode is substantially free of protruding dendrites.

11. The electrochemical cell of claim 10, wherein the at least one transition metal ion-trapping moiety is included in one or more of the following:
a) coated on a surface of the positive electrode;
b) coated on a surface of the negative electrode;
c) coated on a surface of the separator;
d) disposed in pores of the positive electrode as a pore filler;
e) mixed with the polymeric binder material of the positive electrode;
f) disposed in pores of the separator as a pore filler; or
g) grafted as a substitute pendant group onto one or more polymers forming the microporous polymeric separator.

12. The electrochemical cell of claim 10, wherein the electrochemical cell includes the at least one transition metal ion-trapping moiety in an amount greater than or equal to about 5 weight % of a weight of the separator to less than or equal to about 50 weight % of the weight of the separator.

13. The electrochemical cell of claim 10, wherein the malonates are polymer-bound sodium (Na) or lithium (Li) salts of malonic acid; the fumarates are polymer-bound sodium (Na) or lithium (Li) salts of fumaric acid; and the succinates are polymer-bound sodium (Na) or lithium (Li) salts of succinic acid.

14. A method of suppressing or minimizing dendrite formation and improving cycling performance and capacity retention in an electrochemical cell that cycles lithium ions, the method comprising:
introducing at least one transition metal ion-trapping moiety into the electrochemical cell, wherein the at least one transition metal ion-trapping moiety comprises one or more polymers functionalized with one or more trapping groups selected from the group consisting of: 1,7-dialkyldiaza-12-crown-4; 1,4,13-trioxa-7,10-dialkyl-7,10-diazacyclopentadecane; 1,4,10,13-tetraoxa-7,16-dialkyl-7,16-diazacyclooctadecane; 7,16-di(alkylbenzyl)-1,4,10,13-tetra-7,16-diazacyclooctadecane; 3,11-dialkyl-3,11-diaza-1,5,9,13-tetrathiacyclohexadecane; 3,11,19-trialkyl-3,11,19-triaza-1,5,9,13,17,21-hexathiacyclotetracosane; 1,4,7-trialkyl-1,4,7-triazacyclononane; 1,5,9-trialkyl-1,5,9-triazacyclododecane; tetraalkylcyclen; 1,4,8,11-tetraalkyl-1,4,8,11-tetraazacyclotetradecane; hexaalkylhexacyclen, ferrichrome, desferriozamine, desferrioxamine B, desferrioxamine E, fusarinine C, ornibactin, rhodotorulic acid, enterobactin, bacillibactin, bicriobactin, azotobactin, pyoverdine, polymer-bound alkali metal salts of oxalates acid, polymer-bound sodium (Na) or lithium (Li) salts of malonic acid, polymer-bound sodium (Na) or lithium (Li) salts of fumaric acid, polymer-bound sodium (Na) or lithium (Li) salts of succinic acid, polymer-bound alkali metal salts of itaconic acid, polymer-bound alkali metal salts of phosphonic acid, and combinations thereof, wherein after the introducing, the one or more trapping groups bind to iron (Fe) ions within the electrochemical cell to minimize or suppress aggregation of the iron (Fe) ions and formation of dendrite protrusions therein.

15. The method of claim 14, wherein the electrochemical cell comprises:
a positive electrode including a positive lithium-based electroactive material and a polymer binder material;
a negative electrode including a negative electroactive material; and
a microporous polymeric separator disposed therebetween.

16. The method of claim 15, wherein the at least one transition metal ion-trapping moiety is included in one or more of the following:
a) coated on a surface of the positive electrode;
b) coated on a surface of the negative electrode;
c) coated on a surface of the separator;
d) disposed in pores of the positive electrode as a pore filler;
e) mixed with the polymeric binder material of the positive electrode;
f) disposed in pores of the separator as a pore filler; or
g) grafted as a substitute pendant group onto one or more polymers comprising the microporous polymeric separator.

17. The method of claim 15, wherein the one or more trapping groups bound to iron (Fe) ions form a deposited material on one or more exposed surface regions of the negative electrode, wherein the deposited material has an exposed surface that is substantially free of dendrite protrusions.

18. The method of claim 15, wherein the one or more trapping groups bound to iron (Fe) ions sequester iron (Fe) ions preventing movement of the iron (Fe) ions to the negative electrode.

* * * * *